Figure 1:
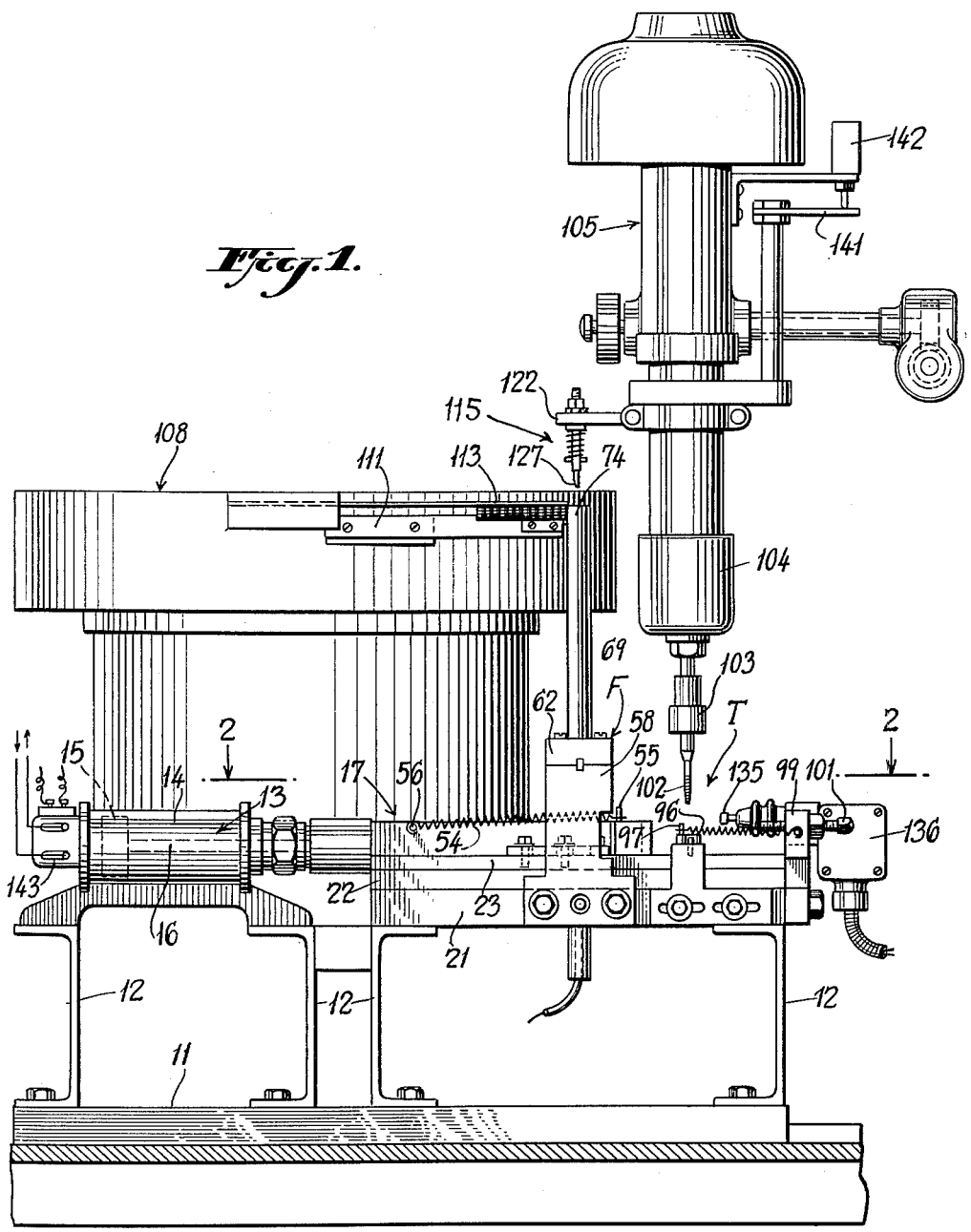

INVENTORS.
FELIX W. BRAENDEL.
ROBERT W. BOSSE.
BY
Dean Fairbank & Hirsch
ATTORNEYS.

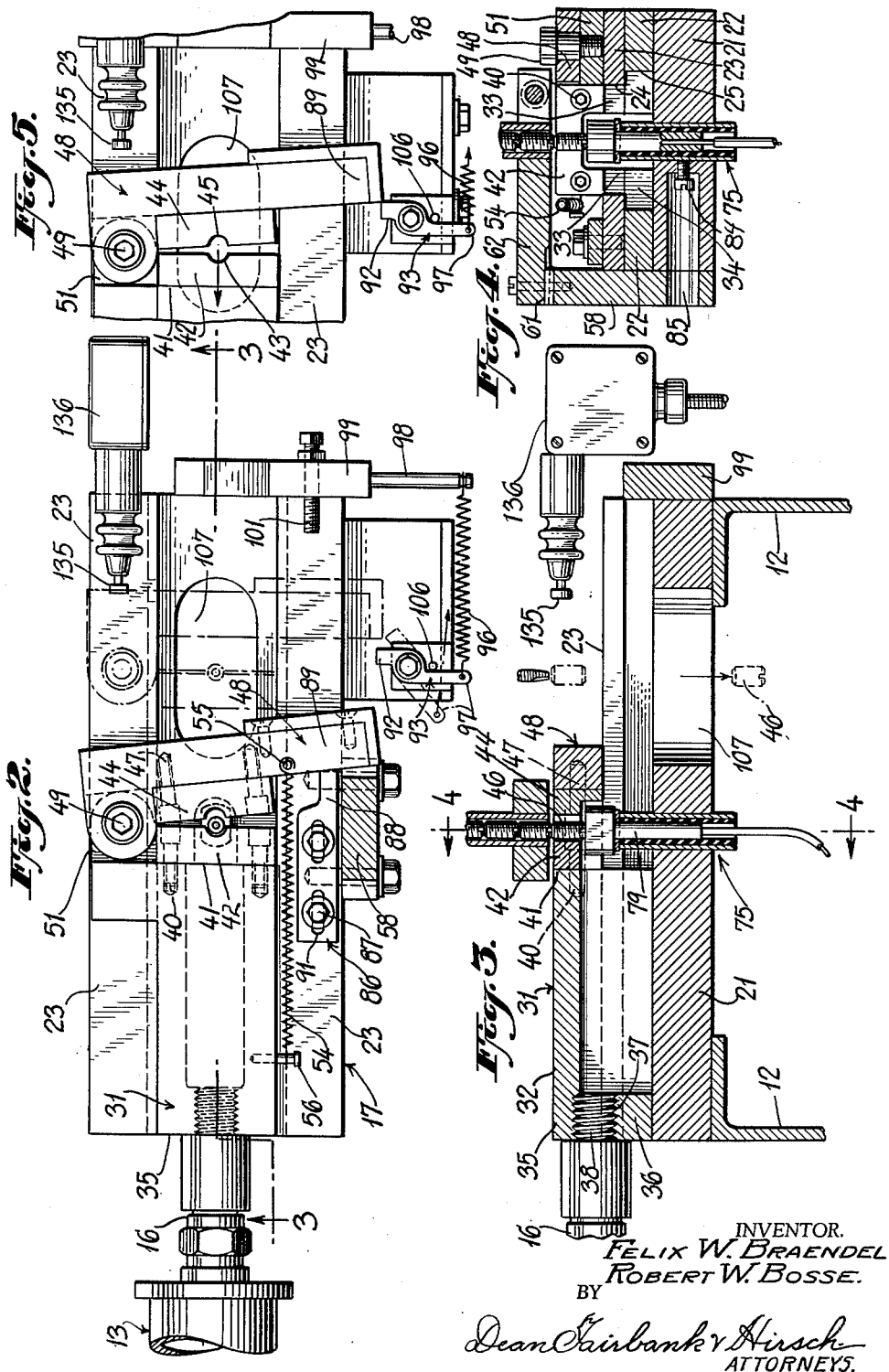

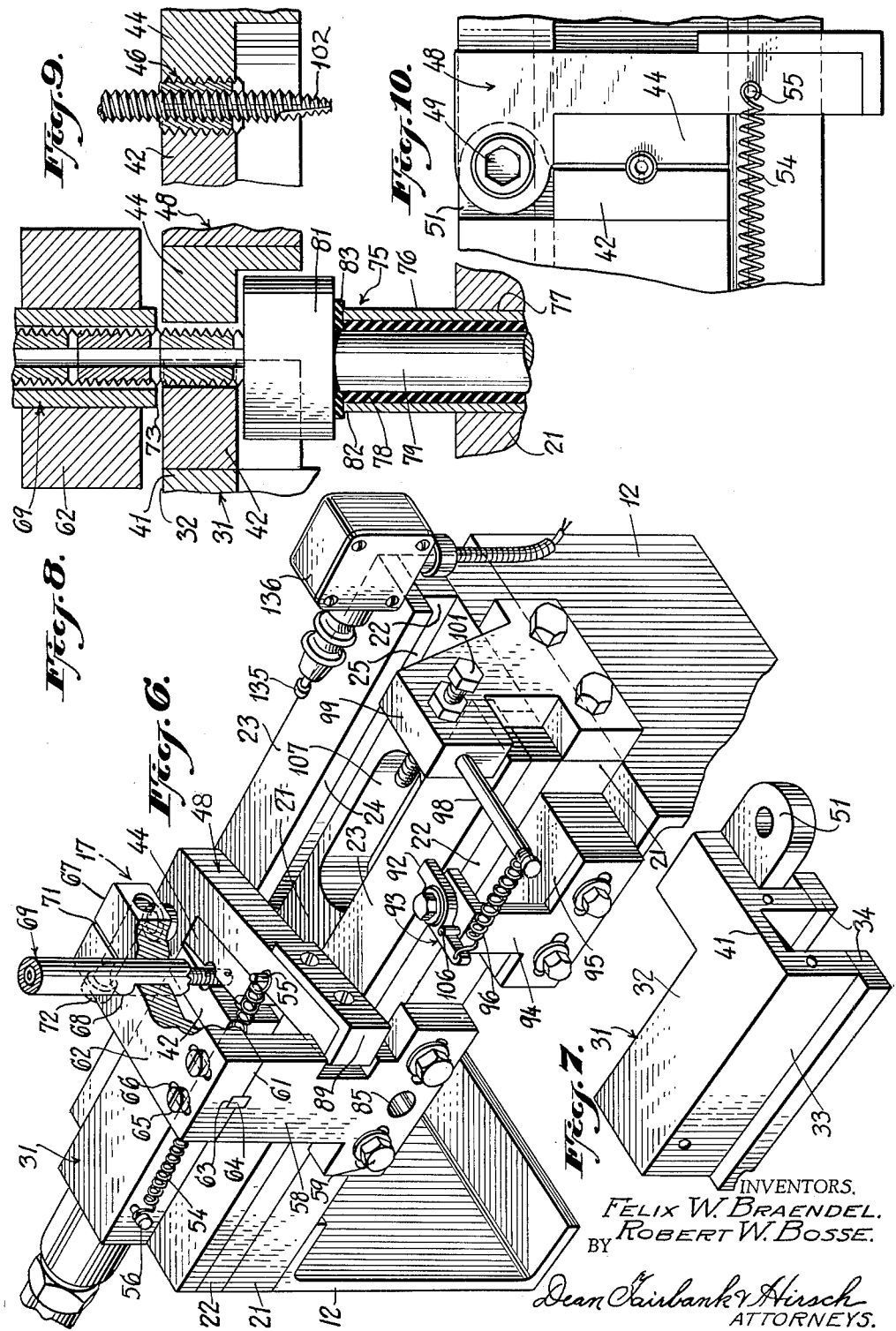

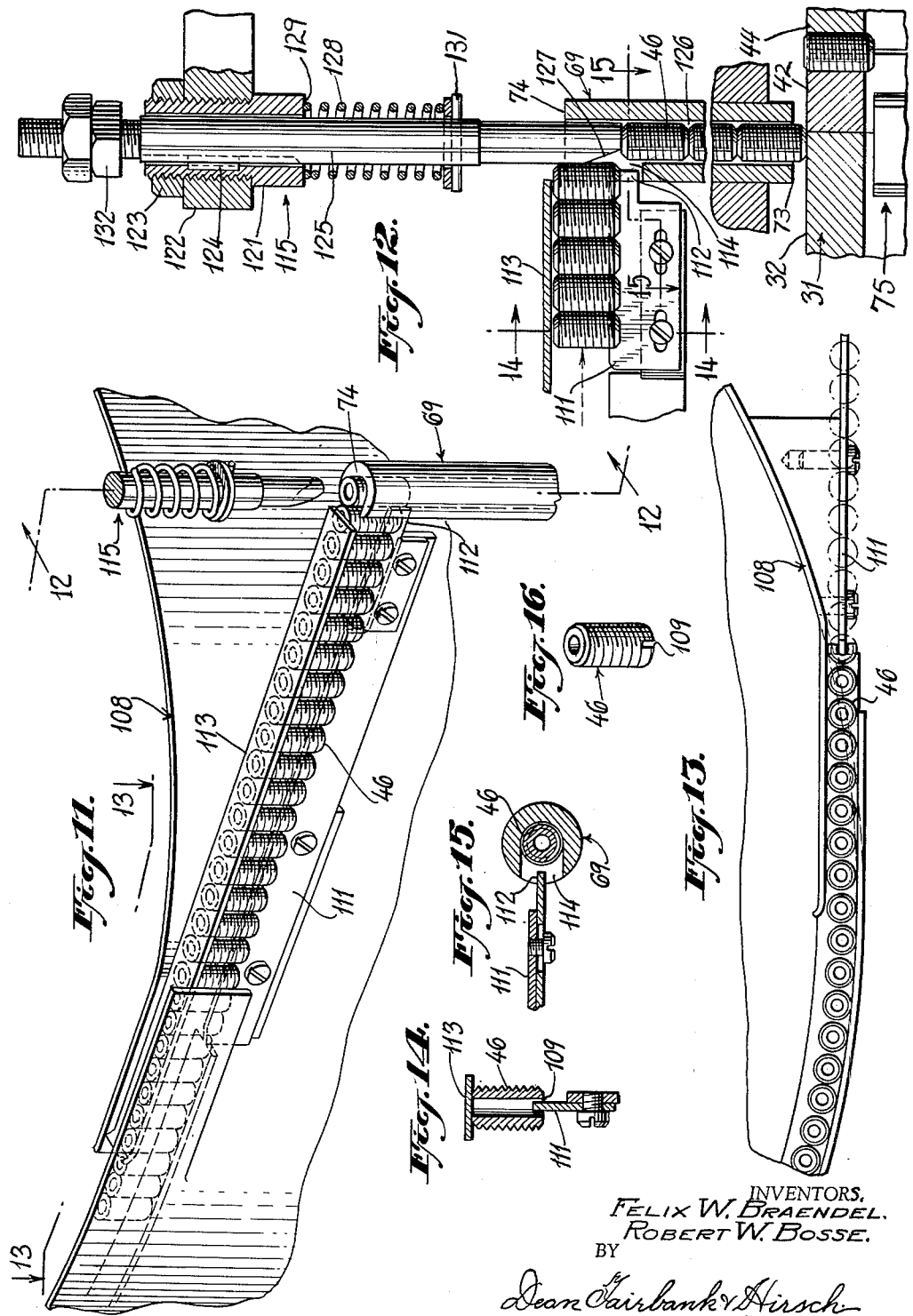

United States Patent Office 3,015,117
Patented Jan. 2, 1962

3,015,117
INSERT TAPPING MACHINE WITH WORK CLAMP MEANS RECIPROCABLE BETWEEN FEED STUD TAPPING STATIONS
Felix W. Braendel, Teaneck, and Robert W. Bosse, North Bergen, N.J., assignors to Groov-Pin Corporation, a corporation of New York
Filed Sept. 6, 1957, Ser. No. 682,494
4 Claims. (Cl. 10—139)

This invention relates to the art of tapping equipment and more particularly to equipment for automatically threading the bore of an insert.

It is among the objects of the invention to provide an equipment that is relatively simple in construction and which will operate at a high rate of speed without likelihood of jamming or becoming deranged dependably and continuously to internally thread a sleeve and more particularly a self-tapping insert of the type that is driven into relatively soft material securely to hold a screw without likelihood of stripping of the threads engaged by such screw.

According to the invention, the equipment comprises a holder which is reciprocated successively to advance inserts from a feeding station to a tapping station. Means are provided automatically to open the holder when it is at the feeding station to receive an insert and the holder automatically closes upon movement to the tapping station securely to grip the insert for the tapping operation. Means are provided upon movement of the holder back toward the feeding station, momentarily to open the holder for discharge of the insert therein.

In a preferred embodiment, means are provided at the feeding station to insure that no movement of the holder to the tapping station can occur until an insert is properly positioned therein.

In the accompanying drawings in which are shown one or more of various possible embodiments of the several features of the invention, FIG. 1 is a front elevational view of the equipment, FIG. 2 is a top plan view thereof, taken along line 2—2 of FIG. 1, FIG. 3 is a sectional view, taken along line 3—3 of FIG. 2, FIG. 4 is a sectional view taken along line 4—4 of FIG. 3, FIG. 5 is a fragmentary detail view showing the clamp bars opening to discharge a tapped insert, FIG. 6 is a fragmentary perspective view of the feed mechanism, FIG. 7 is a perspective view of the feed slide member, FIG. 8 is a detail sectional view on an enlarged scale showing the insert stop member, FIG. 9 is a detail sectional view, showing the insert at the tapping position, FIG. 10 is a fragmentary detail view, showing the clamp bars in closed position, FIG. 11 is a fragmentary perspective view of the feed rail and associated feed mechanism, FIG. 12 is a sectional view, taken along line 12—12 of FIG. 11, FIG. 13 is a fragmentary top plan view of a portion of the vibrating feeder, showing the inserts arranged in a line and taken along lines 13—13 of FIG. 11, FIG. 14 is a detail sectional view, taken along line 14—14 of FIG. 12, FIG. 15 is a detail sectional view, taken along line 15—15 of FIG. 11, and FIG. 16 is a perspective view of a self tapping insert.

Referring now to the drawings, the equipment comprises a base 11 from which rises standards 12, the latter supporting a motor 13 desirably air operated which has a cylinder 14 in which a piston 15 is slidably mounted, the latter having a piston rod 16.

Associated with the motor 13 is the insert holding and advancing unit 17 which holds the insert and advances the latter from the feeding station F to the tapping station T.

As shown in FIGS. 4 and 6, the unit 17 comprises an elongated rectangular block 21 supported at its ends on standards 12 and longitudinally aligned with the motor 13. Affixed to the top surface of block 21 along each of its side edges, are elongated rectangular bars 22 on which are mounted elongated strips 23, the inner edges 24 of which extend inwardly of the inner edge 25 of bars 22, as shown in FIGS. 4 and 6, to define a track.

Slidably mounted on the track is a feed slide, which as shown in FIG. 7, comprises a substantially U-shaped member 31, having a rectangular top wall 32 with depending legs 33 along each of its lateral edges to the lower end of each of which is affixed an elongated strip 34 which extends laterally outward from said legs. Thus such outwardly extending portions of the strips 34 define flanges which will ride beneath the inwardly extending edges 24 of strips 23.

The end 35 of the slide 31 has a wall 36 with a threaded opening 37 to receive the correspondingly threaded end 38 of piston rod 16 of motor 13 which upon actuation will reciprocate the slide 31 in the manner hereinafter described.

Affixed as by screws 40 to the end 41 of the slide 31, is a clamp bar 42 which has a central arcuate recess 43 in one wall thereof. Coacting with bar 42 is a clamp bar 44 which has a central recess 45 therein, adapted to be juxtaposed to recess 43, said bars defining clamp jaws to grip an insert 46 therebetween.

The bar 44 is affixed, as by screws 47, to an arm 48 pivoted on a vertical axis at one end, as at 49, to a finger 51 extending beyond the end 41 of slide 31 and positioned over the associated strip 23.

The arm 48 is normally urged in a clockwise direction about its pivot 49 by a coil spring 54, affixed at one end as at 55, to arm 48 and at its other end to one of the legs 33 of the slide 31 as at 56, to urge the clamp bar 44 against clamp bar 42 to grip an insert 46 therebetween.

Means are provided successively to feed inserts between the clamp bars 42, 44. To this end, as shown in FIG. 6, an upstanding arm 58 is affixed as by screws 59, to one side of the block 21 and rises above the top wall 32 of slide 31. Affixed at one end to the upper end 61 of arm 58, is an arm 62 which extends laterally across the slide 31.

The arm 62 is mounted so that its lateral position may be adjusted. To this end, the arm 62 has an elongated slot 63 in which is positioned a key 64 mounted on the upper end 61 of arm 58. The arm 62 may be secured in desired position, as by screws 65, which extend into said end 61 of arm 58 through elongated slots 66 in the arm 62.

The arm 62 near its end 67 has a vertical bore 68 through which extends a conduit or feed tube 69. Although the tube may be secured in bore 68 in any suitable manner, as illustratively shown in FIGS. 4 and 6, the end 67 of arm 62 has a slot 71 leading into bore 68 and a screw 72 extending transversely through the slit end 67 may be tightened to hold the feed tube 69 in position.

The lower or discharge end 73 of tube 69 is positioned, as shown in FIG. 12, so that it is closely adjacent the top wall 32 of slide 31 and the upper end 74 (FIG. 1) of tube 69 rises considerably above said top wall 32.

The tube 69 is adapted to be vertically aligned with a stop member 75 mounted on the elongated block 21. As shown in FIGS. 3, 4 and 8, the stop member comprises a sleeve 76, extending through a vertical bore 77 midway between the side edges of block 21 and rising above the surface of the latter, the legs 33 of slide 31 straddling said sleeve so that the slide 31 may move thereover.

Extending through the sleeve and electrically insulated therefrom by a bushing 78 is a rod 79 which has a head 81 at its upper end spaced from the upper end 82 of the sleeve by an insulating washer 83.

The vertical position of sleeve 76 in bore 77 is adjustable and the sleeve may be secured in desired position by set screw 84 accessible through an opening 85 in arm 58. Thus the top surface of head 81 may be positioned so that with the lower end of an insert 46 resting thereon, as shown in FIG. 8, the upper end of the insert 46 will be below the lower end 73 of the feed tube 69 to ensure that when the slide 31 carrying the insert 46, is advanced from the feeding station F, shown in FIG. 8, to the tapping station T, shown in FIG. 9, in the manner to be described, the insert 46 will be clear of the tube 69 to prevent jamming. In addition, as is shown in FIG. 8, the upper end of the insert 46 is slightly above the top surface of clamp bars 42, 44 so that only one insert at a time will be gripped therebetween.

Means are provided to space the clamp bar 44 from clamp bar 42 when they are aligned with the feed tube 69 in order that an insert 46 may be positioned therebetween and to move clamp bar 44 toward clamp bar 42 to grip the insert 46 for advance to the tapping station.

To this end, as shown in FIG. 2, a plate 86 is secured as by screws 87 to the strip 23, said plate having a longitudinally extending finger 88 against which the end 89 of arm 48 will abut when the slide 31 is moved to the left to the feeding station by the piston rod 16 of motor 13.

As shown in FIG. 2, the plate 86 has longitudinal slots 91 through which the screws 87 extend to permit adjustment of the position of finger 88. The plate 86 is so located that when the slide 31 is moved to the left, as the arcuate recesses 43, 45 are moved into alignment with the lower end of the feed tube 69, the end 89 of arm 48 will abut against the finger 88 which will cause the arm 48 to pivot in a counterclockwise direction against the tension of spring 54 so that the clamp bars 42, 44 will assume the position shown in FIG. 2.

Thus the lowermost insert 46 in tube 69 will be free to fall by gravity between the spaced clamp bars 42, 44 until the lower end of the insert rests on head 81 of stop member 75 properly located between the bars 42, 44.

As the slide 31 is moved to the right by piston rod 16, the end 89 of arm 48 will move away from finger 88 so that the spring 54 will be free to cause the arm 48 to pivot in a clockwise direction toward clamp bar 42. Hence the insert will be securely retained between the clamp bars 42, 44 in the arcuate recesses 43, 45 for movement to the tapping station.

As the slide is moved to the right, the end 89 of arm 48 will abut against the end 92 of a release arm 93 pivoted on a vertical axis between its ends on a post 94 rising from a block 95 affixed to and extending laterally outward from elongated block 21. The arm 93 is normally urged to pivot in a counterclockwise direction by a coil spring 96 affixed at one end to the end 97 of arm 93 and at its other end to a pin 98 extending laterally outward from a block 99 affixed to one end of elongated block 21.

The block 99 mounts an adjustment screw 101 extending longitudinally of the block 21 and against which the end 89 of arm 48 will abut when the slide 31 has moved to the right to the tapping station to ensure that the clamp bar 44 carried by arm 48 will be firmly urged against clamp bar 42, securely to grip the insert 46 therebetween so that it will be dependably held without turning during the tapping operation.

As shown in FIG. 1, the tap 102 is mounted in the chuck 103 of a conventional tapping head 104 which is mounted on a conventional drill press 105. As the operation of the drill press, which is raised and lowered as desired and the action of the tapping head which is rotated by the drill press in one direction when it is forming the internal threads in the insert and rotated in the opposite direction when the tap is raised out of the insert, is conventional and per se forms no part of the invention, such operation will not be described except to the extent necessary for a clear understanding of the invention.

The insert is removed automatically after it has been internally tapped or threaded by the action of the pivoted release arm 93. Thus when the tapping operation is completed and the tap removed, the slide 31 is moved to the left. As such movement occurs, the end 89 of arm 48 will on its return stroke strike the end 92 of arm 93. However, as the end 97 of arm 93 is retained adjacent a stop pin 106 by the spring 96, the arm 93 cannot rotate further in a counterclockwise direction from the position shown in FIG. 2.

As a result, the arm 48 abutting thereagainst will pivot in a counterclockwise direction against the tension of spring 54 so that the clamp bar 44 will be moved away from the clamp bar 42 releasing the insert 46 therebetween which will drop from the open clamp bars through an elongated slot 107 in block 21 into a suitable hopper or chute (not shown).

Means are provided automatically to feed untapped inserts into the feed tube 69. To this end a vibrating feeder 108 (FIG. 1) is provided illustratively of the type put out by the Syntron Company of Homer City, Pennsylvania, under the name "Syntron." This unit will automatically arrange a batch of untapped inserts 46 in vertical position, as shown, with the slots 109 in the lower end of the inserts straddling a feed rail 111, the inserts 46 advancing along the feed rail 111 toward the discharge end 112 thereof by reason of the vibration imparted thereto by the vibrating unit 108.

To ensure that the vibrating action will not dislodge the inserts from the feed rail 111, an elongated restraining strip 113 is provided extending over the feed rail and slightly spaced from the tops of the inserts thereon so that the latter will be free to advance along the feed rail.

The discharge end 112 of the feed rail 111, as shown in FIG. 12, extends into a vertical slot 114 in the upper end of the feed tube 69, said slot being of width sufficient to permit passage therethrough of an insert.

As shown in FIG. 12, the discharge end 112 of the feed rail 111 is clear of feed tube 69 to prevent dampening of the vibrations required to advance the inserts 46 along the feed rail.

Inasmuch as the inserts are previously externally threaded, it is possible that the threads of the endmost insert 46 on the feed rail 111 and the insert moved into the tube may be interlocked and retained together by the pressure exerted by the vibrating unit against the line of inserts on the feed rail 111. To overcome such condition which would prevent the insert at the top of the tube 69 from falling by gravity, a release device 115 is provided.

Referring to FIGS. 1 and 12, the release device comprises a sleeve 121 extending through a vertical bore in the end of a bracket 122 mounted on the drill press 105 to be reciprocated thereby, the sleeve being secured to bracket 122 by a lock nut 123. Slidably mounted in sleeve 121 and keyed thereto, as at 124, so that it is restrained from rotation is a rod 125 which is substantially vertically aligned with the bore 126 of feed tube 69. The diameter of rod 125 is such that it may freely enter the feed tube 69 and the lower end 127 thereof has a beveled surface aligned with the slot 114 in tube 69.

The rod 125 is resiliently urged downwardly by a coil spring 128 encompassing the rod and compressed between the end 129 of sleeve 121 and a stop pin 131 extending through the rod 125, the downward movement of rod 125 being restrained by a nut 132 screwed on the threaded upper end thereof.

In the operation of the equipment, the vibratory unit is filled with internally untapped inserts and then energized. As a result, in conventional manner the inserts will be arranged vertically and advance along the feed rail 111 toward the discharge end 112 thereof. The feed tube 69 is filled with inserts, and with the clamp bars 42, 44 in open position shown in FIG. 8, the lowermost insert 46 will rest on the head 81, positioned between the spaced clamp bars 42, 44 with the upper end of the insert slightly above the top of the clamp bars.

The motor 13 is energized to start the cycle. Thereupon the piston rod 16 will move the slide 31 to the right. As such movement occurs, and the end 89 of arm 48 moves away from finger 88 (FIG. 2), the spring 54 will cause arm 48 to pivot in a counterclockwise direction so that the insert 46 will be gripped between clamp bars 42, 44.

As the slide 31 moves to the right, the insert 46 above the lowermost insert will rest on the top wall 32 of the moving slide 31 to restrain downward movement of the column of inserts in the feed tube.

In the manner previously described, the end 89 of arm 48 will cam past the pivotal release arm 93 as the slide moves to the right. When the arm 48 abuts against the plunger 135 of microswitch 136, the drill press 105 will be energized and be lowered. Before the tap 102 enters the insert 46, the end 89 of arm 48 will have abutted against screw 101 which will dependably retain the clamp bars together to ensure that the insert 46 therebetween will not rotate while it is being threaded.

At this time the downward movement of the drill press will cause the tap 102 to enter the bore of the insert 46 to internally thread the latter. As the drill press 105 moves downwardly, the end 127 of rod 125 will abut against the topmost insert 46 in the feed tube 69 and exert pressure thereagainst. Assuming that there are no gaps in the column of inserts in the tube 69, as the column cannot move downwardly inasmuch as the lowermost insert 46 in tube 69 is restrained by the top wall 32 of slide 31, the rod 125 will be restrained from further downward movement. However, the bushing 121 carried by bracket 122 mounted on the drill press will move downwardly with respect to the now immovable rod, compressing the spring 128 which exerts constant pressure against the rod 125.

When the insert is completely tapped, the drill press will automatically start to move upwardly and the tap will be withdrawn from the insert.

When the drill press has reached its uppermost position, the arm 141 (FIG. 1) carried thereby will abut against mciroswitch 142 to actuate the switch 143 controlling motor 13. As a result the piston rod 16 will be retracted, moving the slide 31 to the left.

When the end 89 of arm 48 abuts against the end 92 of release arm 93, as previously described, the arm 48 will pivot in a counterclockwise direction to release the tapped insert which will be discharged through slot 107 into a suitable hopper or chute.

With continued movement of the slide to the left, the end 89 of arm 48 will cam past the release arm 93 and when said end 89 abuts against finger 88, with the clamp bars at the feeding station, the bars will be separated ready to receive an insert. Inasmuch as the open clamp bars are now aligned with the feed tube, the lowermost insert will drop by gravity between the open clamp bars until it rests on head 81. The head 81 serves as part of switch to start the cycle previously described, inasmuch as the rod 79 and the head 81 are of suitable conductive material such as steel and the insert which also is of conductive material, when resting on the head, will complete a circuit therefrom to the stacked inserts which in turn contact the feed tube 69. This circuit controls the switch 143 and hence motor 13 will again be actuated to cause the piston rod 16 to move the slide member to the right.

By reason of this construction, it is apparent that if there is no insert resting on the head, the cycle will be interrupted. As a result, if the insert should jam in the tube, the slide member cannot move as it is the insert itself that initiates the cycle of operation.

In the event that the threads of the topmost insert in the tube 69 should be engaged by the threads of the endmost insert on the feed rail 111, when the bottommost insert drops between the open clamp bars, all of the inserts in the feed tube except the topmost insert will drop also. Consequently, there will be a gap between the top most insert and the insert immediately below. If the topmost insert should be restrained from falling for several reciprocations of the slide member, it is apparent that the feed tube would empty and the equipment would stop operating by reason of the fact that no circuit was completed to the stop member 75. However, such a situation is prevented by the rod 125 for when it abuts against the topmost insert 46 in the manner described, it will dislodge the latter from the endmost insert on the feed bar and will force such topmost insert downwardly. Thereupon when the drill press rises and the rod 125 is withdrawn from the tube 69, the vibrating feeder will cause an additional insert to be discharged into the feed tube to fill the latter.

With the equipment above described, inserts may be dependably fed between the clamp bars, securely gripped thereby and tapped at a high rate of speed and with assurance that there will be no jamming of the equipment with resultant breakdown thereof or stoppage for clearance.

As many changes could be made in the above construction and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. Equipment for tapping inserts comprising an insert feeding station, an insert tapping station, a slide member, an insert holder mounted at one end of said slide member, means to reciprocate said slide member to move the holder from said feeding station to said tapping station, said holder comprising a fixed clamp jaw secured to said slide member and a movable clamp jaw pivoted at one end to said slide member and movable toward said fixed clamp jaw to grip an insert positioned therebetween, resilient means reacting against the free end of said pivoted clamp jaw, normally to urge the latter to closed position, said feeding station comprising a vertical tube adapted to carry a plurality of inserts, said tube having a discharge end slightly spaced vertically from the top of said slide member, and a stop member below the discharge end of the tube and spaced therefrom by a distance slightly greater than the length of an insert, means reacting against the free end of the movable clamp jaw when it is at the feeding station to pivot the movable clamp jaw away from the fixed clamp jaw against the tension of said resilient means, whereby the bottommost insert in the tube will be discharged therefrom between said open clamp jaws and rest on said stop, and when said slide member is moved to said tapping station, the resilient means will move the movable clamp jaw toward the fixed clamp jaw to grip the insert, the top surface of the slide restraining discharge of the inserts remaining in the tube, and means when said slide is moved from said tapping station momentarily to move the movable clamp jaw away from the fixed clamp jaw to release the tapped insert, said means comprising a one-way stop against which the free end of the movable clamp jaw abuts in its reciprocating movement, said stop permitting movement of the free end therepast when said slide member is moved from the feeding to the tapping station and momentarily restraining movement of the free end of the movable clamp jaw therepast when the slide member is moved from the tapping station to the feeding station.

2. Equipment for tapping inserts comprising an insert feeding station, an insert tapping station, a slide member, an insert holder mounted at one end of said slide member, means to reciprocate said slide member to move the holder from said feeding station to said tapping station, said holder comprising a fixed clamp jaw secured to said slide member and a movable clamp jaw pivoted at one end to said slide member and movable toward said fixed clamp jaw to grip an insert positioned therebetween, resilient means reacting against the free end of said pivoted clamp jaw, normally to urge the latter to closed position, said feeding station comprising a vertical tube adapted to carry a plurality of inserts, said tube having a discharge end slightly spaced vertically from the top of said slide member, and a stop member below the discharge end of the tube and spaced therefrom by a distance slightly greater than the length of an insert, means reacting against the free end of the movable clamp jaw when it is at the feeding station to pivot the movable clamp jaw away from the fixed clamp jaw against the tension of said resilient means, whereby the bottommost insert in the tube will be discharged therefrom between said open clamp jaws and rest on said stop, and when said slide member is moved to said tapping station, the resilient means will move the movable clamp jaw toward the fixed clamp jaw to grip the insert, the top surface of the slide restraining discharge of the inserts remaining in the tube, and means when said slide is moved from said tapping station momentarily to move the movable clamp jaw away from the fixed clamp jaw to release the tapped insert, said means comprising an arm pivoted between its ends on a vertical axis located between the feeding and tapping stations and having its inner end in the path of movement of the free end of said movable clamp jaw, a stop, resilient means reacting against the free end of the arm in direction towards the tapping station, normally to retain the free end thereof against said stop, whereby when said free end of the movable clamp jaw in movement from the feeding station to the tapping station, abuts against the inner end of the arm it will pivot said arm and move therepast and when the free end of the movable clamp jaw in movement from the tapping station to the feeding station abuts against the inner end of the arm, as the free end thereof will be urged against the stop, the movable clamp jaw will be pivoted to open position until it moves past said inner end of said arm.

3. Equipment for tapping inserts comprising an insert feeding station, an insert tapping station, a slide member, an insert holder mounted at one end of said slide member, means to reciprocate said slide member to move the holder from said feeding station to said tapping station, said holder comprising a fixed clamp jaw secured to said slide member and a movable clamp jaw pivoted at one end to said slide member and movable toward said fixed clamp jaw to grip an insert positioned therebetween, resilient means reacting against the free end of said pivoted clamp jaw, normally to urge the latter to closed position, said feeding station comprising a vertical tube adapted to carry a plurality of inserts, means continuously to charge said tube as inserts are discharged therefrom, said means comprising a feed rail having a discharge end, said tube at its upper end having a slot to afford passage therethrough of an insert, the discharge end of said feed rail being in juxtaposition to said slot, a vibrating feeder to advance inserts along said rail to discharge through said slot into said tube, said tube having a discharge end slightly spaced vertically from the top of said slide member, and a stop member below the discharge end of the tube and spaced therefrom by a distance slightly greater than the length of an insert, said tapping station comprising a drill press having a vertically reciprocable member adapted to carry a tap at one end, a vertical rod carried by said vertically reciprocable member and aligned with said tube, whereby when said member is moved downwardly to tap said insert, the end of said rod will abut against the topmost insert in the tube to dislodge the latter from the insert at the end of the feed rail, means reacting against the free end of the movable clamp jaw when it is at the feeding station to pivot the movable clamp jaw away from the fixed clamp jaw against the tension of said resilient means, whereby the bottommost insert in the tube will be discharged therefrom between said open clamp jaws and rest on said stop, and when said slide member is moved to said tapping station, the resilient means will move the movable clamp jaw toward the fixed clamp jaw to grip the insert, the top surface of the slide restraining discharge of the inserts remaining in the tube, and means when said slide is moved from said tapping station momentarily to move the movable clamp jaw away from the fixed clamp jaw to release the tapped insert.

4. The combination set forth in claim 3 in which said vertically reciprocable member carries a vertical bushing, said rod is slidably mounted in said bushing, resilient means reaching against said rod normally to urge it downwardly, and means at the upper end of the rod protruding beyond the upper end of the bushing to limit the downward movement of said rod.

References Cited in the file of this patent

UNITED STATES PATENTS

| | | |
|---|---|---|
| 317,601 | Welker | May 12, 1885 |
| 1,063,593 | Raiche | June 3, 1913 |
| 1,581,022 | Saylor | Apr. 13, 1926 |
| 2,398,659 | Mead | Apr. 16, 1946 |
| 2,644,964 | Mackintosh | July 14, 1953 |
| 2,732,570 | Carpenter | Jan. 31, 1956 |
| 2,764,800 | Harwood | Oct. 2, 1956 |
| 2,803,377 | Wilson | Aug. 20, 1957 |
| 2,811,876 | Batchelder | Nov. 5, 1957 |